Oct. 1, 1935.  C. D. BARR ET AL  2,015,776
CHARGING, WEIGHING AND CONTROLLING MECHANISM FOR CASTING MACHINES
Filed April 12, 1932  3 Sheets-Sheet 3

INVENTORS
CLARENCE D. BARR
and STEPHEN D. MOXLEY
ATTORNEY

Patented Oct. 1, 1935

2,015,776

UNITED STATES PATENT OFFICE 2,015,776

CHARGING, WEIGHING, AND CONTROLLING MECHANISM FOR CASTING MACHINES

Clarence D. Barr and Stephen D. Moxley, Birmingham, Ala., assignors to Sand Spun Patents Corporation, New York, N. Y., a corporation of Delaware Application April 12, 1932, Serial No. 604,848

14 Claims. (Cl. 22—79)

Our present invention relates generally to the art of centrifugally casting hollow metal bodies, such as cast iron pipe or the like, and has to do more particularly with improved means for weighing molten metal from which each article is made, charging the molten metal into the mold or flask, and for automatically controlling the operation of the latter, said controlling means in the instance herein shown being thrown into operation by mechanism associated with and actuated by the charging means.

In the manufacture of hollow metal bodies, such as cast iron pipes, by the centrifugal method, it is desirable that each and every pipe of a given size shall have a predetermined weight, that is, the weight of all pipes of the same size shall be substantially the same. Obviously, this requires an accurate measurement by weight of the molten metal for each cast charged into the mold or flask, and the weighing and charging must be accomplished with dispatch, so that the molten metal will not congeal before poured.

It has been proposed heretofore to measure or weigh the molten metal before it is charged into the flask, but in all prior arrangements with which we are familiar, the method of weighing and the weighing mechanism have been such that great care and skill are required on the part of the operator, who pours the metal from the supply ladle into the charging ladle, in order to accomplish the desired result, and consequently the pouring operation has been slowed up.

One of the objects of the present invention is to provide a simple and durable construction of weighing and charging mechanism for the purposes specified, wherein the weighing of the molten metal is accomplished with accuracy in a most convenient manner and requiring little or no skill and particular watchfulness on the part of the operator.

Another object of the invention is to provide a tiltable ladle for receiving the molten metal from the supply ladle and pouring the same into the flask, and means for operating the pouring ladle so that it will have an even motion, and means for adjustably controlling the speed of pouring, which speed, regardless of adjustment, remains constant throughout the pouring operation.

Another object of the invention is to provide means for establishing the pouring ladle in weighing relation with weighing mechanism of a scale, and to provide the scale with a settable indicator and a construction and arrangement of weighing beams such that the scale pointer will move only when the quantity of molten metal in the ladle nears the amount desired, so that the operator need watch the movement of the scale pointer toward the settable indicator only during the time that the last relatively few pounds of metal are being poured into the ladle; and in connection with the foregoing, to provide means in the nature of a tare beam and weight associated therewith and movable thereon to take care of changes in the condition of the ladle affecting its weight, such as accumulations of "scull" during the successive pouring operations.

Another object of the invention is to provide automatic means actuated by the ladle operating mechanism for controlling the speed of rotation of the motor which rotates the mold or flask, it being understood that the motor and mold or flask are, under some systems, run at variable speeds during each casting operation, that is, in some instances, the flask rotates at about 30 to 50 R. P. M. while the metal is being poured therein and thereafter is accelerated up to a full casting speed which depends upon the diameter and class of pipe being cast.

Another object of the invention is to provide means for quick adjustment of the time in the cycle of pouring, at which the automatic means actuated by the ladle operating mechanism is set into operation to accelerate the rotation of the motor and flask to form the pipe.

Other objects of the invention include the provision of means for materially reducing vibration during the casting operation; and means to prevent shock of the pouring ladle and its associated operating mechanism against its support when it returns from pouring position.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the accompanying drawings.

Figure 1:
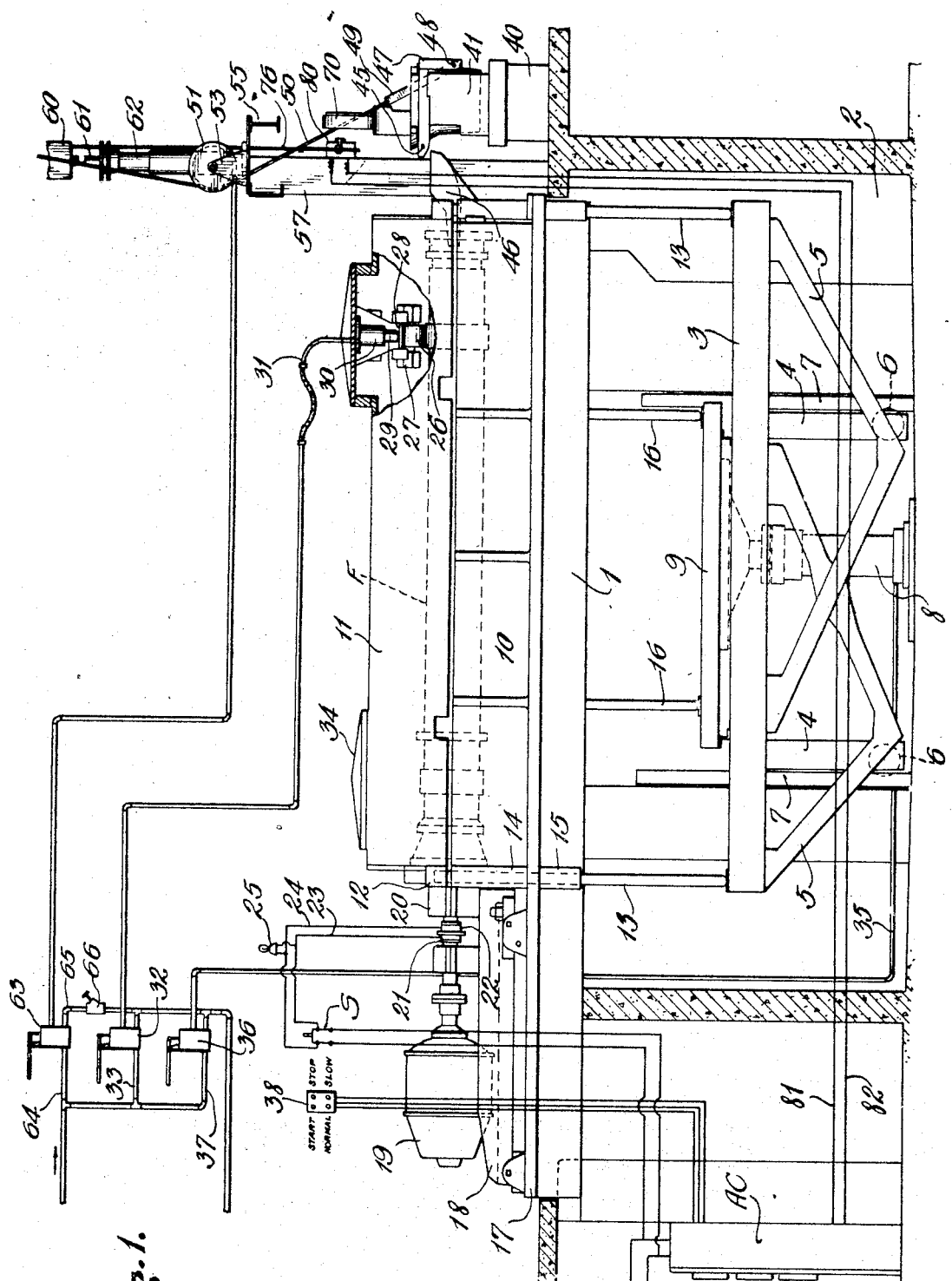
Fig. 1 is a side elevation of apparatus embodying the invention and showing the supporting foundation in section.

In general, the apparatus shown in Fig. 1 is similar to that disclosed in Patent No. 1,783,094, to W. D. Moore et al., in that the frame or bed plate 1 is composed of longitudinally extending bars and cross-bars connecting the longitudinal bars at suitable intervals, and the frame being supported above the pit 2, in which is located the platen 3 carried by a pair of depending brackets 4 and inclined braces 5, which extend downwardly and inwardly in pairs at opposite sides of the platen, and which are connected at their lower ends to the brackets 4. A pair of wheels 6 are supported by each of the brackets 4, and each pair of wheels engages rails 7 arranged between the frame 1 and the bottom of the pit 2. Also, as in Patent No. 1,783,094, the platen 3 is moved upwardly and downwardly by a hydraulic lift 8 arranged therebeneath in the bottom of the pit and to which fluid is delivered under pressure in a manner hereinafter described, the platen having guided rolling contact in its vertical movement by engagement of the wheels 6 with the rails 7. The platen 3 has arranged thereon and centrally thereof a smaller platen 9.

A carriage or bed 10 for supporting the flask F is supported on the bed 1 and is provided as in Patent No. 1,783,094, with flask supporting rollers, not shown, on which the flask is positioned during the charging and casting operation. A hood 11 which is curved transversely is arranged over the flask with its concave surface downward to confine the gases and any flying metal during the charging and casting operation. At each corner of the hood there is a socket 12 to receive the upper ends of rods 13, which rods are mounted through tubular members 14 and 15 on the bed 10 and frame 1 respectively, with their lower ends engaging the upper surface of the platen 3, so that when the platen 3 is raised by the hydraulic lift 8, the hood will be raised. Similarly, provision is made for lifting the flask F by rods 16 which have their lower ends resting on the platen 9 and their upper ends disposed for engagement with the flask support to raise the same from bed 10 when the hood has been raised a predetermined distance as disclosed in Patent No. 1,783,094. The means for discharging the flasks from and admitting flasks to the machine is also preferably the same as that disclosed in said patent, whereby as one flask is raised from the bed with the pipe or other article cast therein, it rolls down runways, while at the same time, an empty flask to receive a charge of molten metal approaches the rollers from another runway and is positioned on the rollers for a repeat of the charging and casting operation. All of this mechanism is fully described in the said patent, and, therefore, is not shown or described herein, as it forms no part of the present invention.

One difference between the apparatus disclosed in the present application and that disclosed in Patent No. 1,783,094, resides in the construction of the frame 1, but as this feature forms no part of the present invention, it is merely mentioned here for the purpose of enabling a clear understanding of the drawings, which show the frame 1 as being extended longitudinally at one end to include as an integral part, a supporting area 17 for the adjustable bed 18, on which is mounted the motor 19 for rotating the flask through the medium of mechanism, such as described in Patent No. 1,783,094, including a magnetic clutch indicated generally at 20, operated by collecting rings 21 and 22, against which brushes, not shown, are disposed, the brushes being connected respectively to wires 23 and 24 leading through a switch S to the positive and minus leads from a source of electric current supply. The switch is interposed in the circuit mentioned for breaking the circuit when desired, as hereinafter described, and it is preferable to mount an electric lamp 25 across the wires 23 and 24 to absorb back E. M. F. caused by residual flux in the coils of the magnetic clutch.

In the present instance, we have shown in connection with the hood 11, a roller 26, carried by and journaled on an arm 27, which is pivoted at one end to a bracket or support on one side of the hood and against the other end of which, as shown at 28, is arranged a piston 29 actuated by hydraulic pressure admitted to the cylinder 30 through pipe 31 when the three-way valve 32 which is interposed between the conduit 31 and conduit 33, leading from a source of supply, not shown, of fluid under pressure, is operated to admit fluid through the conduit 31 to the cylinder 30 so that the roller 26 will be depressed against the spinning band of the flask to exert a downward pressure to reduce vibration during the operation or rotation of the flask. As indicated generally at 34, provision may be made for similar arrangement of a pressure roller at the bell end of the flask, it being only necessary to take another lead from the conduit 31, so that pressure will be applied to rollers at both ends of the flask during the casting operation.

A conduit 35 leads from the hydraulic lift 8 through a three way valve 36, also connected by a pipe 37, with the source of fluid supply under pressure. From the foregoing it should be understood that when it is desired to prepare a casting, the valve 36 is opened to admit fluid under pressure to the hydraulic lift 8, whereby the platens 3 and 9 will be lifted to raise the hood and then the flask support so that a flask can be admitted to the machine on the spinning rollers in the manner specified in Patent No. 1,783,094, or by other means if desired. When the empty flask is on its support, the valve 36 is operated to establish communication between the pipe 37 and the fluid exhaust pipe leading from the valve to an exhaust source to permit the flask support and hood to descend with the platens 9 and 3 until they reach their lowermost position. If the motor, its shaft, and the clutch mechanism, which constitute a unit, has not already been adjusted to aline with the end of the flask, such adjustment is made and the switch S is closed, so that the magnetic clutch will function to couple the flask and the motor for rotation together. At this time a switch marked "Start" on the electrical control board 38 is closed so that the automatic control mechanism AC, such as disclosed in Patent No. 1,783,094, will function to start the motor and flask rotating at from 30 to 50 R. P. M., which is the speed found best for rotation of the flask during the charging operation about to be described.

Figure 3:
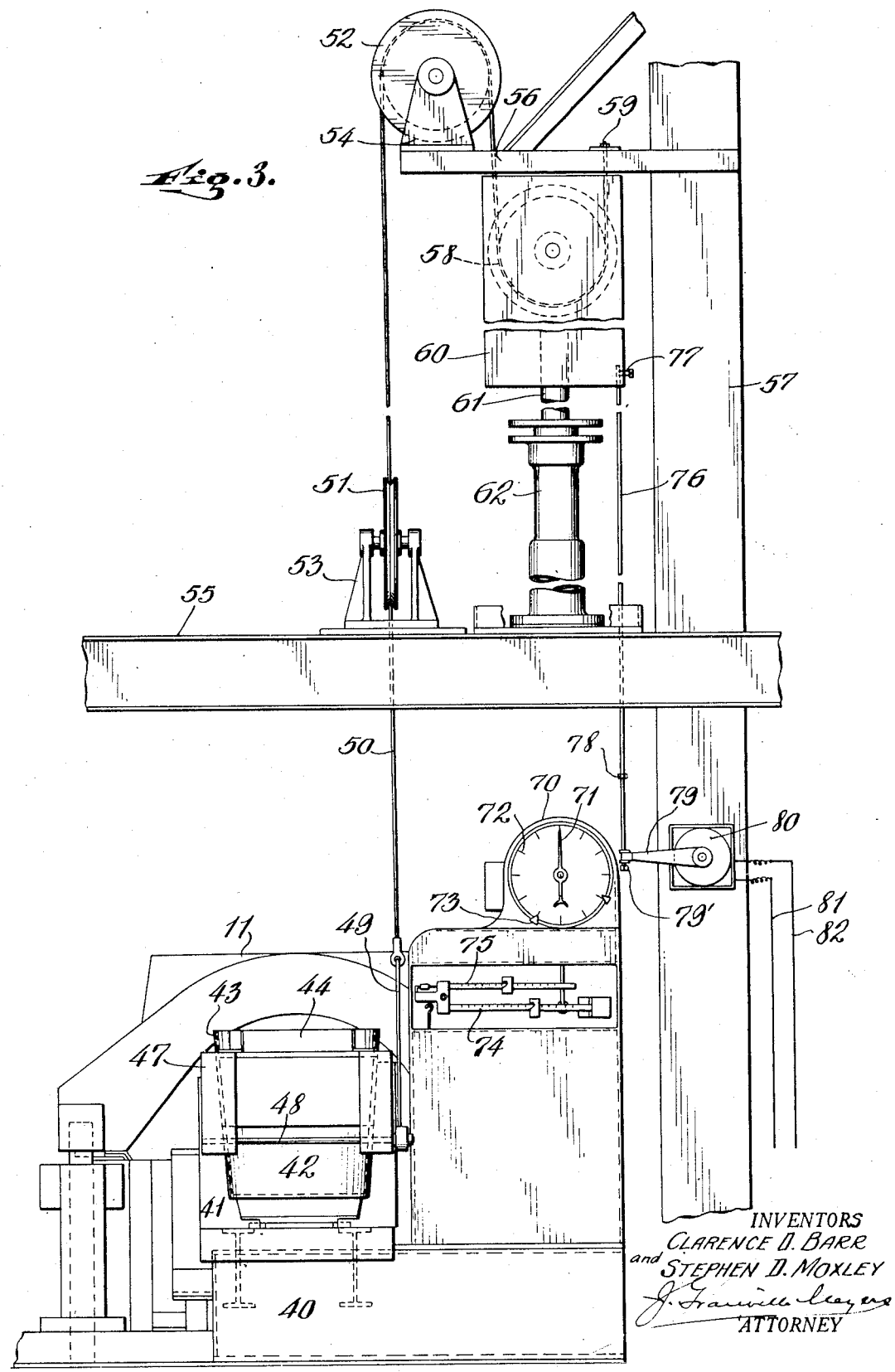
Fig. 3 is an end elevation of the apparatus shown in Fig. 2 and showing the weighing and indicating mechanism with the means for controlling the rotation of the flask actuated by the charging means.

The pouring or charging apparatus shown in the accompanying drawings is entirely different in construction, arrangement and operation from that known or used prior to our invention, and comprises a relatively small compact platform scale, indicated generally at 40, in Fig. 3, mounted in front of the spigot end of the machine, and on which is mounted a bracket 41.

The pouring ladle 42 has laterally extending lugs 43 to engage the upper edge of the horizontal arms of a yoke 44 which is pivoted about a fulcrum 45 on the bracket 41 and adjacent the pouring spout 46 which leads into the spigot end of the flask. The yoke has connected to the rear ends of the horizontal arms 44, vertical arms 47, between which, and adjacent their lower ends, is connected a rod 48, the rod having connected thereto one end of a link 49, the other end of which is connected to a cable 50, which passes around sheaves 51 and 52 which are rotatably mounted in fixed brackets 53 and 54 respectively, on the horizontal beams 55 and 56 supported by an upright support 57. A sheave 58 beneath which the cable is disposed, is connected to or mounted on a counterweight 60, and the counterweight receives the plunger 61, of a hydraulic cylinder 62, which may be conveniently mounted on the horizontal support 55. The end of the cable is fixedly connected by any suitable means at 59 to the support 56, so that the sheave 58 and weight 61 are movably supported by the cable at times and for purposes hereinafter specified.

The plunger 61 is actuated and controlled by means of the three way operating valve 63, Fig. 1, similar to the valves 32 and 36. The valve 63 is connected by a conduit 64 to the same source of fluid pressure supply mentioned in connection with valves 32 and 36, and has an exhaust pipe 65 leading therefrom. Exhaust leads or conduits from the valves 32 and 36 may also be conveniently connected with the exhaust pipe 65, as shown in Fig. 1, but interposed in the exhaust pipe 65 between the valve 63 and the valves 32 and 36, and their connections with the pipe 65, is mounted a needlevalve 66, operable to vary the area of the opening in the discharge pipe 65 from the valve 63 and hence regulate the rate of discharge of fluid from the cylinder 62, whereby the rate at which the counterweight 60 can move downwardly is accurately determined and controlled, as hereinafter particularly described.

Figure 2:
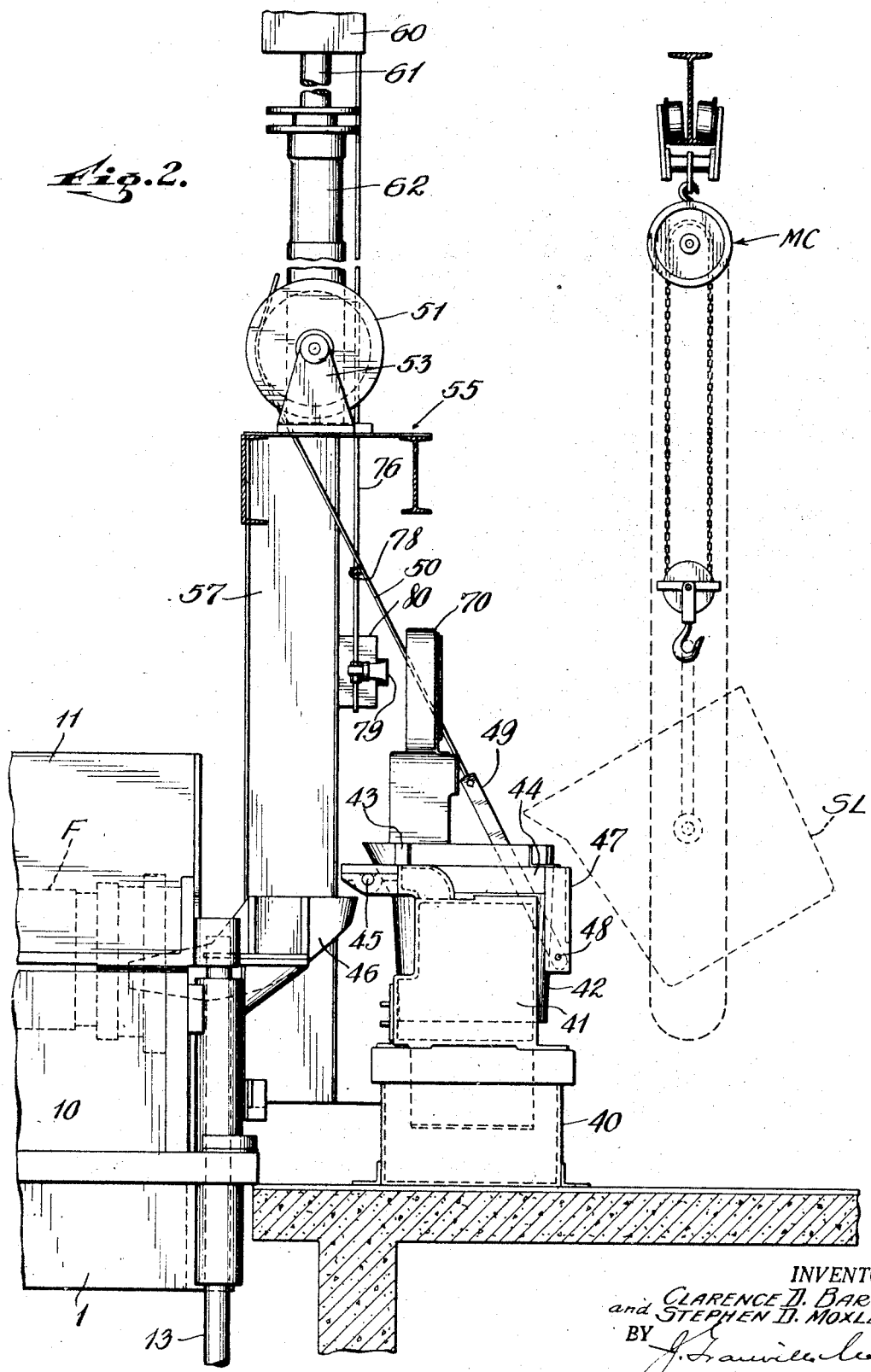
Fig. 2 is an enlarged side elevation showing the pouring ladle, its support, and tilting mechanism with the supply ladle and a portion of the mold or flask shown in dotted lines.

Referring again to Fig. 3, it will be noted that the scale 40, which is preferably of the platform type, is equipped with an indicating dial 70, having in association therewith, the usual pointer 71, and the dial being provided with indicating graduations 72. The dial is positioned to face the operator of the monorail crane indicated generally at MC in Fig. 2, which carries the supply ladle SL from which the molten metal is poured into the ladle 42 in usual manner. The graduations on the dial 70 may be calculated to designate various units of weight. According to the present invention the dial has associated therewith on its outer periphery, a settable tab or indicator 73, for a purpose hereinafter described. Also as shown in Fig. 3, the scale is equipped with two graduated weight beams 74 and 75 respectively. The larger beam 74 is adapted and used to counterbalance a major portion of the weight of the molten metal to be poured into the ladle 42 for a particular casting. The smaller beam 75 is a tare beam by which the ladle, bracket, and other mechanism mounted on the platform of the scale can be counterbalanced. The tare beam is also adapted to be adjusted from time to time, so that as "scull" and/or other matter accumulates in or on the ladle from constant and repeated use and increase the dead weight of such equipment, the slide on the tare beam can be moved to overcome this additional weight and to make the pointer coincide with zero on the dial.

When an initial pouring is to be made and it is known what the weight of the particular casting is to be, the slides on the two beams 74 and 75 are manipulated in the following manner. Supposing that 557 lbs. of molten metal is to be poured into the ladle 42, the slide on the beam 75 is moved until the empty ladle and its associated dead weight equipment is balanced and zero is indicated by the pointer on the dial. After this adjustment the slide on the beam 74 is moved to the 500 lb. mark, and the tab 73 on the dial is moved until it indicates or coincides with a graduation indicating 57 lbs. With the adjustments so made, the operator of the monorail crane tilts the supply ladle to pour into the ladle 42, and during the pouring there is no movement of the pointer 71 until 500 lbs. of molten metal has been delivered into the ladle 42 to overcome the setting on the beam 74 and after which the pointer begins to leave zero position, thus indicating only the metal poured beyond the 500 lbs. This movement of the pointer warns the operator that the predetermined amount of metal is being approached and he watches the pointer as it leaves the zero indications and approaches the tab 73. He stops the pouring operation when the pointer reaches the tab, which is of a readily visible character, thus delivering with facility and accuracy the 557 lbs. of molten metal which is the desired amount, and it only being necessary for him to watch the pointer during its movement through a relatively small arc instead of having to make calculations by watching the dial rotate throughout the entire pouring. It should be obvious that if any scull accumulates in the ladle 42, so that the pointer 71 does not coincide with the zero mark before subsequent pourings, that it is only necessary to move the slide on the beam 75 sufficient to overcome or counterbalance the weight of the scull and reestablish the pointer in registry with the zero marking. It should also be obvious, that with the arrangement shown and described, that the apparatus can be used for various sized castings simply by manipulating the tab 73 and the slides on the rods 74 and 75 in the manner above specified.

The pouring operation, that is, the pouring from the ladle 42 into the flask is accomplished automatically and with a constant or even action, because the hydraulic pressure is used only to raise the counterweight 60 and return the ladle 42 to receiving position as the cable 50 moves downwardly across the sheaves 52 and 51. When the proper amount of molten metal has been poured into the ladle 42 and the needlevalve 66 has been properly adjusted to regulate the flow of fluid from the cylinder 62 through the valve 63 and pipe 65 to the exhaust, as hereinabove explained, the descending movement of the weight 62 under gravity forces fluid from cylinder and moves the sheave 58 down and thus exerts a constant pull on the cable, which in its upward travel tilts the yoke 44 and hence the ladle 42 on the fulcrum 45.

The rotation of the flask is also controlled by the pouring mechanism, for, as shown in Figs. 1 and 3, a rod 76 is connected to the weight 60 as by screw 77, and adjacent its lower end there is connected or mounted thereon, a cable clamp 78, while the lower end of the rod 76 extends through a pivoted arm 79 which operates an electric trip switch indicated generally at 80, and which is connected by the wires 81 and 82 to the automatic control mechanism AC. The cable clamp 78 constitutes an abutment to move the arm 79 and through it the switch 80 to accelerate the speed of rotation of the flask through the automatic control mechanism at the proper time. The cable clamp 78 being adjustable can be positioned on the rod 76 at such a point that it will contact with the arm 79 as the rod 76 moves down with the weight 60 to set up rapid rotation of the flask or establish the accelerating period to cast the pipe or other article according to the particular type or weight of pipe or article being cast. The screw 79' on the end of rod 76 abuts the arm 79 when rod 76 is raised and reestablishes the arm 79 in position to actuate the switch 80 for the next casting.

The spout 46 is preferably pivotally mounted on a vertical axis so that it can be conveniently turned to position its end outside of the flask, after the metal has been delivered into the mold.

The control board or switch mechanism 38, the switch S, and valves 32, 36, and 63, are located at a point convenient to an operator, who supervises and controls, so far as manual control or action is necessary, the casting operation as follows. When a pipe or similar article is to be cast, the operator opens the valve 36 to admit fluid under pressure through the pipe 35 to the cylinder or hydraulic lift 8, whereby the platens 3 and 9 will be raised to lift the flask bed and the hood 11 until the flask bed or support is positioned to receive a flask preferably from automatic delivering apparatus or runways, such as disclosed in Patent No. 1,783,094. When the flask is in place on the bed, the operator turns the valve 36 to cut off the flow of fluid under pressure from the supply pipe or source of supply and permitting the fluid to pass from the cylinder 8 through pipe 35 and valve 36 and the exhaust pipe. Whereupon, the flask and hood are lowered. Thereupon, the operator closes switch S to energize the magnetic clutch 20 and couple the motor and its shaft to the flask, the details of the apparatus for accomplishing this being also disclosed in Patent No. 1,783,094. When the motor and flask have been thus coupled for rotation, the operator presses the start button on the switchboard 38 so that the proper circuit will be established through the automatic control apparatus AC to rotate the motor and flask at the usual or desired speed of rotation to be maintained during the pouring operation, which, as previously stated, is at a relatively low speed around 50 R. P. M. When the monorail crane with the supply ladle containing the molten metal arrives at the flask 42, and assuming that the slide on the tare beam has been adjusted to balance the ladle and its supporting apparatus at zero in the manner hereinbefore specified, and the slide on the other beam has been set to counterbalance most of the weight while the tab 73 has been set at the graduation indicating the remainder, the operator of the monorail crane tilts the supply ladle to cause the molten metal to flow into the ladle 42, and when the pointer on the dial 70 coincides with the settable indicator or tab 73, he immediately tilts the supply ladle back to stop the flow of molten metal.

The ladle 42 of course is in upright position and the weight 60 is in raised position, being maintained in such position by the pressure admitted from the source of supply through the valve 63 and the pipe leading therefrom to the cylinder 62. To tilt the ladle 42 and pour the molten metal down the spout 46 into the slowly rotating flask, the operator manipulates the valve 63 until communication is established therethrough from the cylinder 62, and the pipe 65 to permit the fluid to be forced through the pipe 65 and the needlevalve 66, which has been previously set to regulate the flow of fluid from the cylinder as the weight 60 descends by gravity and forces plunger 62 down. Cable 50 and rod 49 on the yoke which supports the ladle thus receive a constant pull tilting the ladle forwardly on its fulcrum 45. It will be understood that the rate at which the molten metal is poured from the ladle 42 into the slowly rotating flask is governed by the setting of the needlevalve 66 which determines the escapement area through which the fluid can flow.

As previously explained, the cable clamp 78 is set, according to the pipe or article to be cast, at the proper point on the rod 76 to determine when the switch 80 will be operated as the rod 76 and clamp 78 descend with the weight 60 for abutment of clamp 78 with the arm 79. Of course, if the clamp 78 is further away from the rod 79 than shown in the drawings, the switch will be operated at a later time, and vice versa. As soon as the arm 79 is moved by the cable clamp 78 to close a circuit through the switch and wires 81 and 82 and proper connections in the automatic control mechanism, the rotation of the flask is accelerated to casting speed.

Either before the metal is poured, that is, just after the hood has been lowered, or at any time thereafter, the operator may manipulate the valve 32 to admit pressure through the pipe 31 to depress the piston 29 against the arm 28 carrying the roller 26, whereby the roller will be forced against the spinning band of the flask to reduce vibration, as hereinbefore mentioned.

When the casting operation has been completed, the operator opens the switch S to disconnect the motor and flask, and subsequently operates the valve 36 to cause fluid under pressure to flow into the cylinder 8, so that the platens 3 and 9 will raise the hood and flask to permit the flask to be removed from its bed, which may be accomplished by the automatic means disclosed in Patent No. 1,783,094, and when a new flask is delivered to the bed, the casting operation is repeated in the manner above specified.

If any scull has accumulated in the ladle 42, prior to any casting and of such an amount as to disturb the balance of the scales so that the pointer does not register zero, it is simply necessary to move the slide on the tare beam 75 to compensate for the additional weight, whereby all of the pipes of the same type and class will be of substantially identical weight.

We wish to be understood as not limiting the use of the charging means to association with the means for controlling the speed of rotation of the flask as the same can be used for charging molten metal into flasks which are rotating at a casting speed during the charging, which is the practice in casting certain types of pipe and articles.

We claim:

1. In apparatus for pouring molten metal into a flask for centrifugal casting, a pouring ladle, fluid pressure actuated mechanism for establishing said ladle in receiving position, a weight movable against said fluid pressure mechanism for tilting said ladle into pouring position while forcing fluid from said fluid pressure mechanism, and means for selectively regulating the flow of fluid from the fluid pressure mechanism to regulate the rate of pouring movement of the ladle for different pouring operations.

2. Charging apparatus for centrifugal casting machines comprising, a pouring ladle, means tiltably supporting said ladle, a cable connected with said means, a pulley receiving the cable intermediate its ends, a weight supported on said cable to exert a constant pull on the cable to tilt the ladle supporting means and ladle, and means for adjustably controlling the rate of movement of the weight to control the rate of tilting movement of the ladle.

3. The structure of claim 2 wherein the means for controlling the rate of movement of the weight and the ladle comprising fluid pressure mechanism having a plunger, said plunger being depressible by the descending movement of the weight during pouring movement of the ladle to expel fluid from said mechanism, and a valve to regulate the rate of flow of fluid being expelled.

4. In apparatus for centrifugally casting pipes and including, a tiltable pouring ladle to receive molten metal and to pour the same into a casting mold, means for clearly indicating to the operator of the bull ladle when the proper quantity of molten metal is delivered comprising, a weighing scale, a ladle support mounted on said scale in weighing relation with the weighing mechanism, said scale having a dial confronting the operator of the bull ladle and movable weight indicator associated therewith, means for counterbalancing the weight of the ladle and its support so as to position the movable indicator at a predetermined point relative to the dial, means for counterbalancing a substantial portion of the metal delivered to said first means to permit movement of said indicator only after such portion has been delivered, and a second indicator settable on the dial at predetermined points along the path of travel of the movable indicator, the distance between the starting point of the movable indicator and the set position of the second indicator representing the balance of the weight of the remainder of the mass of molten metal desired for a particular casting.

5. In a centrifugal casting machine including a bed to receive a flask, electrically actuated means to rotate said flask on said bed, gravity actuated means independent of said flask and bed for charging molten metal into the flask while on said bed, a switch for closing an electric circuit to accelerate the speed of rotation of the electrically actuated means to accelerate the speed of rotation of the flask on said bed, and means operable by said gravity actuated means for operating said switch.

6. Apparatus for centrifugally casting hollow metal bodies comprising a rotary mold, means for rotating the mold, a charging ladle, means tiltably supporting said ladle adjacent one end of the mold, a cable connected with said means, a pulley receiving the cable intermediate its ends, a weight supported on said cable to exert a constant pull on the cable to tilt the ladle supporting means and ladle to charge molten metal into the mold, a switch electrically connected with said mold rotating means, and means interposed in the direction of movement of the weight when tilting the ladle for operating said switch to accelerate the speed of said mold rotating means.

7. An apparatus for centrifugally casting hollow metal bodies comprising a rotary mold, means for rotating the mold, a charging ladle, means tiltably supporting said ladle adjacent one end of the mold, a cable connected with said means, a pulley receiving the cable intermediate its ends, a weight supported on said cable to exert a constant pull on the cable to tilt the ladle supporting means and ladle to charge molten metal into the mold, a switch electrically connected with said mold rotating means, and means interposed in the direction of movement of the weight when tilting the ladle for operating said switch to accelerate the speed of said mold rotating means, said last means being adjustable to vary the time in the pouring cycle for operating said switch.

8. An apparatus for centrifugally casting hollow metal bodies comprising a rotary mold, means for rotating the mold, a ladle for charging molten metal into the mold, means for tilting said ladle to pouring position, means for adjustably regulating the rate of pouring movement of the ladle and the rate of flow of molten metal therefrom, and means operable by said ladle tilting means for accelerating the speed of rotation of the mold, said last means being adjustable to vary the time in the pouring cycle when said mold rotating means is accelerated.

9. An apparatus for centrifugally casting hollow metal bodies comprising a rotary mold, means for rotating the mold, a charging ladle, means tiltably supporting said ladle adjacent one end of the mold, a cable connected with said means, a pulley receiving the cable intermediate its ends, a weight supported on said cable to exert a constant pull on the cable to tilt the ladle supporting means and ladle to charge molten metal into the mold, a switch electrically connected with said mold rotating means, means interposed in the direction of movement of the weight when tilting the ladle for operating said switch to accelerate the speed of said mold rotating means, and means for raising the weight and restoring the ladle to receiving position during rotation of the mold.

10. An apparatus for centrifugally casting hollow metal bodies comprising a rotary mold, means for rotating the mold, a charging ladle, means tiltably supporting said ladle adjacent one end of the mold, a cable connected with said means, a pulley receiving the cable intermediate its ends, a weight supported on said cable to exert a constant pull on the cable to tilt the ladle supporting means and ladle to charge molten metal into the mold, a switch electrically connected with said mold rotating means, and means interposed in the direction of movement of the weight when tilting the ladle for operating said switch to accelerate the speed of said mold rotating means, a fluid operated piston in the path of movement of the weight adapted to be depressed thereby during tilting of the ladle, and a needle valve in the fluid pressure line to control the flow of fluid and the rate of tilting movement of the ladle for different pouring operations.

11. In apparatus for centrifugally casting pipes, a bed on which a flask is rotatably supported, a pouring ladle, means tiltably supporting said ladle adjacent one end of the bed, a cable connected to said means at one end, a pulley receiving said cable intermediate its ends, a weight connected to the other end of said cable, a fluid pressure mechanism including a piston below and in alinement with said weight and adapted to be depressed by the descending movement of the weight to effect tilting of the ladle and adapted to raise said weight to restore the ladle to its normal position.

12. In apparatus for centrifugally casting pipes, a bed on which a flask is rotatably supported, a pouring ladle, means tiltably supporting said ladle adjacent one end of the bed, a cable connected to said means at one end, a pulley receiving said cable intermediate its ends, a weight connected to the other end of said cable, a fluid pressure mechanism including a piston below and in alinement with said weight and adapted to be depressed by the descending movement of the weight to effect tilting of the ladle and adapted to raise said weight to restore the ladle to its normal position, and a valve included in said fluid pressure mechanism and adjustable to regulate the descending movement of the weight and consequently the rate of tilting of the ladle.

13. In apparatus for pouring molten metal into a flask for centrifugally casting pipes, a bed on which the flask is rotatably supported in substantially horizontal position, means for rotating said flask in said position at different speeds during pouring of the molten metal and casting of the pipes, a ladle adjacent one end of the bed, means tiltably supporting said ladle, a cable connected to said means supporting the ladle, a pulley receiving said cable intermediate its ends, a weight connected to the other end of the cable, fluid pressure mechanism beneath said weight and including a plunger engaged and depressed by the weight during the descending movement of the weight when tilting the ladle, and means operable by said descending movement of the weight to increase the speed of rotation of the flask.

14. In apparatus for pouring molten metal into a flask for centrifugally casting pipes, a bed on which the flask is rotatably supported in substantially horizontal position, means for rotating said flask in said position at different speeds during pouring of the molten metal and casting of the pipes, a ladle adjacent one end of the bed, means tiltably supporting said ladle, a cable connected to said means supporting the ladle, a pulley receiving said cable intermediate its ends, a weight connected to the other end of the cable, fluid pressure mechanism beneath said weight and including a plunger engaged and depressed by the weight during the descending movement of the weight when tilting the ladle, means operable by said descending movement of the weight to increase the speed of rotation of the flask, and a valve in said fluid pressure mechanism for regulating the rate of tilting of the ladle by controlling the descending movement of the weight.

CLARENCE D. BARR.
STEPHEN D. MOXLEY.